(12) United States Patent
Jeyakar M R et al.

(10) Patent No.: US 12,365,213 B2
(45) Date of Patent: Jul. 22, 2025

(54) AIR SUPPLY CONTROL ARRANGEMENT FOR A HEAVY DUTY VEHICLE COMPRISING A LIFT AXLE

(71) Applicant: Volvo Truck Corporation, Gothenburg (SE)

(72) Inventors: Amarnath Jeyakar M R, Surandai (IN); Sunil Angadi, Dharwad (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 26 days.

(21) Appl. No.: 18/511,463

(22) Filed: Nov. 16, 2023

(65) Prior Publication Data
US 2024/0174042 A1    May 30, 2024

(30) Foreign Application Priority Data
Nov. 28, 2022  (EP) ..................................... 22210040

(51) Int. Cl.
*B60G 17/052*  (2006.01)
*B62D 61/12*  (2006.01)

(52) U.S. Cl.
CPC .... *B60G 17/0525* (2013.01); *B60G 2202/152* (2013.01); *B60G 2204/4702* (2013.01); *B62D 61/125* (2013.01)

(58) Field of Classification Search
CPC .......... B60G 17/0525; B60G 2202/152; B60G 2204/4702; B60G 17/005;
(Continued)

(56) References Cited

U.S. PATENT DOCUMENTS

| 3,178,201 A | 4/1965 | Richnow, Jr. |
| 8,973,922 B2 * | 3/2015 | Koelzer ................ F16K 11/085 280/124.16 |

(Continued)

FOREIGN PATENT DOCUMENTS

| AU | 2012271602 A1 * | 11/2013 | ............. B60G 11/27 |
| CN | 201694021 U | 1/2011 | |

(Continued)

OTHER PUBLICATIONS

Extended European Search Report, European Patent Application No. 22210040.6, mailed May 26, 2023, 9 pages.

*Primary Examiner* — Drew J Brown
(74) *Attorney, Agent, or Firm* — Sage Patent Group (57) ABSTRACT

The present disclosure relates to an air supply control arrangement for a heavy-duty vehicle including a lift axle which comprises a brake chamber. The air supply control arrangement includes a control valve and a lever. The control valve has a closed first state in which pressurized air along an air supply passage is blocked by the control valve, and an open second state in which pressurized air is allowed to pass through the control valve along the air supply passage. The lever has a first portion connected to the control valve and a second portion connectable to the lift axle so that when the lift axle is raised from its ride condition to its lift condition the lever moves the control valve from the open second state to the closed first state. When the lift axle is lowered to its ride condition the lever moves the control valve back to the open second state.

15 Claims, 5 Drawing Sheets

(58) Field of Classification Search
CPC ........ B60G 2202/412; B60G 2202/415; B60G 2300/0262; B60G 2300/042; B60G 2300/402; B62D 61/125
See application file for complete search history.

(56) References Cited

U.S. PATENT DOCUMENTS

2003/0038412 A1    2/2003  Plath
2018/0319451 A1 *  11/2018 Smith ................ B60G 17/0155

FOREIGN PATENT DOCUMENTS

| DE | 102019006409 | A1 | * | 3/2021 | |
|----|--------------|----|---|--------|--|
| EP | 0075764 | A2 | | 4/1903 | |
| EP | 0403771 | A2 | * | 12/1990 | |
| EP | 2070741 | A1 | * | 6/2009 | ......... B60G 17/0525 |
| EP | 2540536 | A1 | * | 1/2013 | ........... B60G 17/052 |
| EP | 2902225 | A1 | * | 8/2015 | ............. B60G 11/27 |
| GB | 2165500 | A | | 4/1986 | |
| GB | 2191741 | A | | 12/1987 | |
| IN | 201621026520 | | | 9/2018 | |
| IT | 1208030 | B | * | 6/1989 | ........... B60G 17/005 |

* cited by examiner

AIR SUPPLY CONTROL ARRANGEMENT FOR A HEAVY DUTY VEHICLE COMPRISING A LIFT AXLE

CROSS REFERENCE TO RELATED APPLICATIONS

This application claims priority to European Patent Application No. 22210040.6, filed on Nov. 28, 2022, the disclosure and content of which is incorporated by reference herein in its entirety.

TECHNICAL FIELD

The disclosure relates generally to an air supply control arrangement. In particular aspects, the disclosure relates to an air supply control arrangement for a heavy duty vehicle comprising a lift axle. The disclosure can be applied in heavy-duty vehicles, such as trucks, buses, and construction equipment. Although the disclosure may be described with respect to a particular vehicle, the disclosure is not restricted to any particular vehicle.

BACKGROUND

A heavy-duty vehicle may be equipped with a lift axle that can be raised so that its tires do not touch the road surface, for example when driving without any cargo. When the vehicle is heavily loaded, the lift axle can be lowered so that the tires of the lift axle assist in support the heavy weight. Being able to raise the lift axle when not needed for load support improves fuel/battery economy. In existing systems, when brakes are applied, the service brakes are normally activated for all axles, including the lift axle, irrespective of if it is in its lifted condition or in its ride condition. Due to this, the consumption of the pressurized air used for braking is increased in each brake cycle. This leads to an increase of the compressor duty cycle. For battery electric vehicles this will also reduce the drive range.

SUMMARY

According to a first aspect of the disclosure, there is provided an air supply control arrangement for a heavy-duty vehicle comprising a lift axle which comprises a brake chamber, the air supply control arrangement comprising:
  a control valve configured to be arranged in an air supply passage that enables pressurized air to be supplied from a pressurized air source to a brake chamber of a lift axle of a heavy-duty vehicle, the control valve having a closed first state in which pressurized air along the air supply passage is blocked by the control valve, and an open second state in which pressurized air is allowed to pass through the control valve along the air supply passage,
  a lever having a first portion which is connected to the control valve and having a second portion configured to be connected to the lift axle so that when the lift axle is raised from its ride condition to its lift condition the lever moves the control valve from the open second state to the closed first state, and when the lift axle is lowered from its lift condition to its ride condition the lever moves the control valve from the closed first state to the open second state. The first aspect of the disclosure may seek to avoid unnecessary braking of the wheels of the lift axle, and thus reduce unnecessary consumption of pressurized air. A technical benefit may include that the brakes of the lift axle do not need to become engaged when the wheels and tires of the lift axle are lifted and thus do not contribute to the travelling motion of the vehicle. However, when the lift axle is in its ride condition, the brakes may be engaged again. When the air supply control arrangement is provided installed on a vehicle, and the second portion of the lever has been connected to the lift axle, an automatic controlling of the valve may be achieved based on lift axle condition. By providing a lever which moves the valve between the closed first state and the open second state based on the orientation and/or movement of the lever, a simple yet effective mechanical switching between the two states of the valve may be achieved. Put differently, the valve may be arranged to follow the movements of the lever, and the movements of the lever may follow the movements of the lift axle, i.e., a raising movement from ride condition to lift condition, and the opposite lowering movement from the lift condition to the ride condition. Thus, when the lift axle is changed from one of said conditions to the other one, the lever will also move and will cause the valve to change from one of said states to the other one.

In some examples, the control valve has an upper end and a lower end, wherein the control valve is configured to be mounted to the heavy-duty vehicle so that the upper end is located above the lower end, wherein a direction extending from the lower end to the upper end is defined as an upwards direction, wherein the lever is configured to push the control valve upwards when the lift axle is lowered from its lift condition to its ride condition. A technical benefit may include that an upwards pushing movement provides a convenient direction of motion for changing the state of the valve. Since the lowering of the lift axles may commonly be a motion that follows an arc of a circle, the second portion of the lever will also follow such an arcuate motion, and thereby the first portion of the lever (which is connected to the control valve) will be forced upwardly, pushing the control valve. The lever will normally be a rigid body, and therefore when the second portion of the lever is moved in a direction towards a position underneath the lower end of the control valve, then due to the rigidity of the lever, the first portion being fixed to the control valve, will force the control valve upwardly.

The first portion of the lever may suitably be pivotally connected to the control valve. The second portion of the lever may suitably be configured to be pivotally connected to the lift axle. The lever may suitably have a rigid main portion between the first portion forming the pivoting connection to the control valve and the second portion configured to form a pivoting connection to the lift axle.

In some examples, when the lift axle is in its lift condition the lever is configured to extend at a first angle from the control valve, and when the lift axle is in its ride condition the lever is configured to extend at a second angle from the control valve, the second angle being different compared to the first angle. A technical benefit may include that this can be implemented for lift axles following a curved path when moving between its lift condition and ride condition. The control valve may suitably be prevented from moving horizontally, only allowing vertical motion. A change in angle of the lever will cause a change in vertical position of the control valve.

In some examples, when the lever extends at said first angle its main direction of extension is closer to the horizontal compared to when it extends at said second angle, and when the lever extends at said second angle its main direction of extension is closer to the vertical compared to when it extends at said first angle. A technical benefit may include that similarly to the discussion above, this too can be implemented for lift axles following a curved path when moving between its lift condition and ride condition.

In some examples, the air supply control arrangement further comprises a spring device providing a spring force on the control valve, wherein the lever is configured to provide a counter-force against the spring force when holding the control valve in either one of the first state and second state. A technical benefit may include, that by providing a spring device, as long as the lever is functional the control valve can work as intended, however, if the lever for some reason cannot provide sufficient counter-force, i.e., indicative of malfunctioning, the spring device can move the control unit to an end position which can be made used of in different ways, some of which will be exemplified below. Generally speaking, such an end position should suitably set the control unit in a state which is independent of the current condition of the lift axle.

In some examples, the control valve has an open fail-safe third state, wherein when the lever is broken or damaged such that the lever fails to provide the counter-force required to hold the control valve in the first or second state, then the spring device causes the control valve to move to the open fail-safe third state in which pressurized air is allowed to pass through the control valve along the air supply passage. A technical benefit may include that the brakes of the lift axle will be able to become engaged irrespective of the condition of the lift axle, thereby providing a safety feature in case the lever should become broken and thus not being able to move the control valve to the open second state when the lift axle is in its ride condition. Hereby, the risk of loss of braking functionality can be avoided in case the lever becomes damaged.

In some examples, the control valve comprises an integrated switch, wherein when the control valve reaches the open fail-safe third state the switch gets closed, thereby triggering an alert to the driver. A technical benefit may include that by alerting the driver, he/she can at an early convenience get the air supply control arrangement repaired to regain the advantageous functionality of controlling the allowability of pressurized air supply to the lift axle brake chambers based on the condition of the lift axle.

In some examples, the control valve comprises two channels:
one channel which, when the control valve is in the open second state, connects the pressurized air source located upstream of the control valve with a downstream portion of the air supply passage, and
another channel which, when the control valve is in the open fail-safe third state, connects the pressurized air source with said downstream portion of the air supply passage.

A technical benefit may include that by having two different channels that allow the pressurized air source to become fluidly connected to the downstream portion of the air supply passage, the control valve can be made movable, such as exemplified above, and can enable fluid communication when the lift axle is in its ride condition with a normally functioning lever, but also when the lever is broken and therefore, as a safety measure, braking engagement should be possible irrespective of the condition of the lift axle.

In at least some examples, the control valve is configured to be movable to three vertically different positions, a highest position, an intermediate position and a lowest position, wherein
when in the highest position, the control valve is in the open second state,
when in the intermediate position, the control valve is in the closed first state, and
when in the lowest position, the control valve is in the open fail-safe third state.

A technical benefit may include that assigning the lowest position to the open fail-safe third state is that even for examples which do not include a spring device, the gravitational force may still urge the control valve downwards when the lever is broken and cannot provide an upwardly directed force to the control valve.

In some examples, the air supply control arrangement further comprises:
an electronically controlled brake valve device, which when opened allows pressurized air received in the brake valve device to be passed to the brake chamber, and when closed prevents pressurized air received in the brake valve device from being passed to the brake chamber, wherein the degree of the opening and/or the duration of the opening of the brake valve device is controlled by an electronic brake request received by the brake valve device, wherein the control valve is arranged upstream of the brake valve device and downstream of the pressurized air source,
wherein when the control valve is in the open second state and the brake valve device receives an electronic brake request, then pressurized air is allowed to be passed to the brake chamber, whereas when the control valve is in the closed first state and the brake valve device receives an electronic brake request, the control valve blocks pressurized air from the pressurized air reservoir from reaching the brake valve device.

A technical benefit may include that, even though the driver applies the brakes of the vehicle, e.g., pressing the foot brake pedal, there will be no braking action on the lift axle if the control valve is in its closed first state, i.e., if the lift axle is in its lifted condition. Hereby, pressurized air is not wasted on braking the lift axle when it is in its lifted condition. When a driver presses the foot brake pedal an electronic brake request may be sent to the electronically controlled brake valve device (e.g., from a foot brake modulator translating the movement of the foot brake pedal into an electric signal to the brake valve device). The brake valve device will therefore open in line with the received electronic brake request, but there will be no braking action if the control valve is in its closed first state, i.e., if the lift axle is in its lifted condition.

In some examples, the switching between the first and the second state of the control valve is mechanically actuated by the lever. A technical benefit may include that unlike for example a solenoid valve, there is no need for an electronic actuating signal to change the state of the control valve.

According to a second aspect of the disclosure, there is provided a vehicle comprising the air supply control arrangement of the first aspect, including any example thereof. The vehicle further comprises a lift axle and a body part such as a chassis, wherein the control valve is mounted to said body part and wherein the second portion of the lever is connected to the lift axle so as to follow movements of the lift axle. The second aspect of the disclosure may, similarly to the first aspect seek to avoid unnecessary braking of the wheels of the lift axle, and thus reduce unnecessary consumption of pressurized air. A technical benefit may include that the brakes of the lift axle do not need to become engaged when the wheels and tires of the lift axle are lifted and thus do not contribute to the travelling motion of the vehicle.

In some examples, the first portion of the lever is connected to a bottom portion of the control valve. A technical benefit may include that the lever may effectively push the control valve upwards to change the state of the control valve.

In some examples, when the lever is lowered from its lift condition to its ride condition, the first portion of the lever pushes the bottom portion of the control valve upwards. Similarly to above, a technical benefit may include that the lever may effectively change the state of the control valve.

In some examples, the lift axle may be a manually controlled lift axle. In some examples the lift axle may be an automatically, such as load based, controlled lift axle. Thus, the teachings of the present disclosure is not limited to how the lift axle is lifted, but may be readily implemented for different lifting solutions.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

The present disclosure teaches that consumption of the pressurized air used for braking may be saved when the lift axle is in its lift condition. This leads to a decrease of the compressor duty cycle. For battery electric vehicles this will also increase the drive range.

Figure 1:
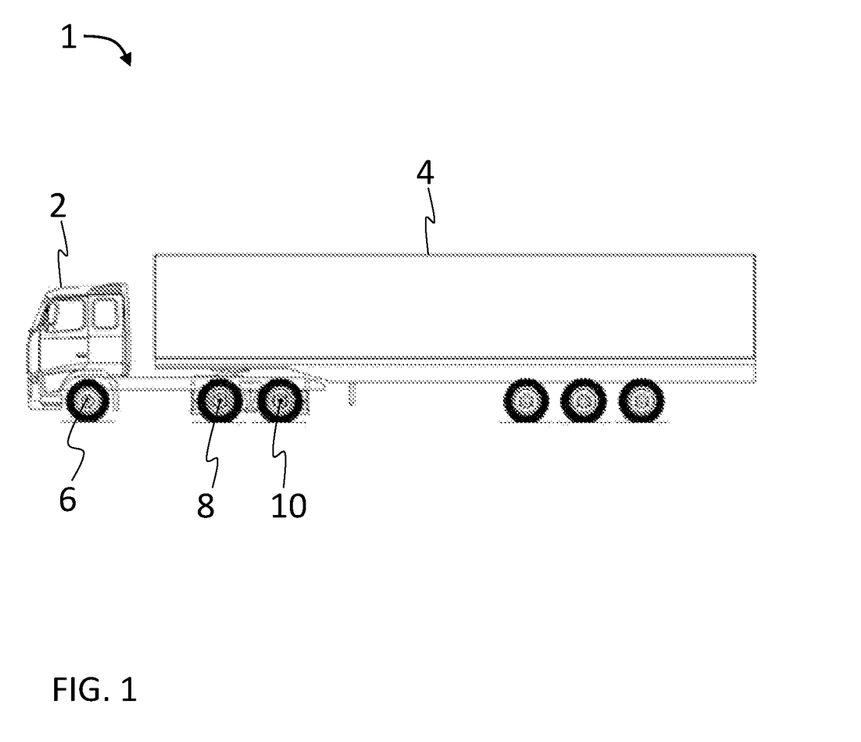
FIG. 1 schematically illustrates a vehicle according to one example of this disclosure.

FIG. 1 schematically illustrates a vehicle 1 according to one example of this disclosure. More specifically, the illustrated vehicle 1 is a heavy-duty vehicle combination which comprises a tractor unit 2 and a trailer unit 4. The tractor unit 2 has three wheel axles 6, 8, 10, each one of the wheel axles 6, 8, 10 having at least one left wheel and at least one right wheel. In this example, the tractor unit 2 has a front axle 6 and two rear axles 8, 10. One or the rear axles 8, 10 may be a lift axle. For example, the two rear axles 8, 10 may be configured such that the lift axle is a pusher axle 8 in front of a drive axle 10. In other examples, the two rear axles 8, 10 may be configured such that the lift axle is a tag axle 10 behind a drive axle 8. It should be understood that the teachings of this disclosure may be implemented for any lift axle, irrespective of its location. Indeed, the teachings of this disclosure are not limited to lift axles on tractor units, but may be implemented for lift axles on trailer units as well, such as full trailers or semi-trailers. Additionally, the teachings of the present disclosure is not limited to a particular vehicle propulsion system, i.e., the teachings herein may be implemented for vehicles propelled by internal combustion engines, traction batteries, fuel cells, hybrid systems, etc. Furthermore, the teachings of the present disclosure may be implemented for driver-operated vehicles and for autonomous (self-driving) vehicles.

Figure 2A:
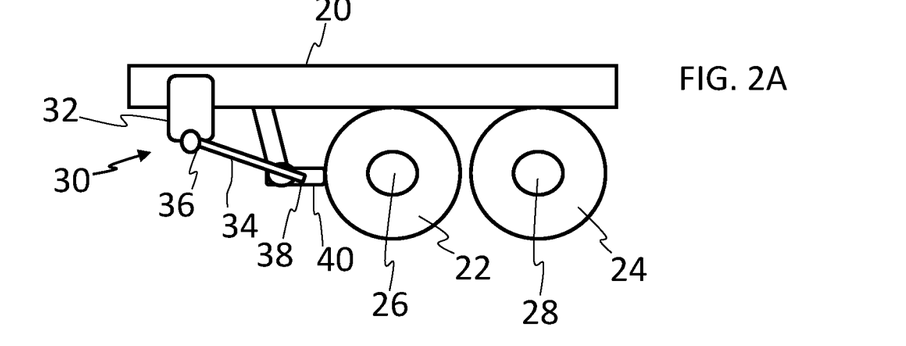
FIGS. 2A-2C schematically illustrate three different scenarios for an air supply control arrangement according to one example of this disclosure.
Figure 2B:
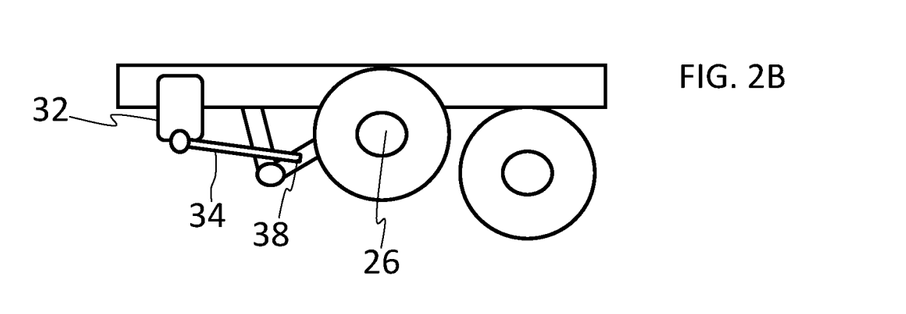
Figure 2C:
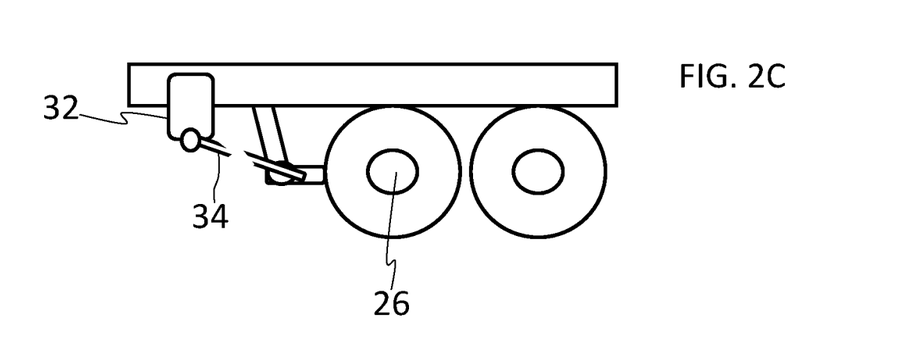

FIGS. 2A-2C schematically illustrate three different scenarios for an air supply control arrangement according to one example of this disclosure. In FIG. 2A, there is schematically illustrated a part of a chassis 20 of a vehicle, for example the vehicle 1 in FIG. 1 or another vehicle. Two left wheels 22, 24 are illustrated, each one being mounted to a respective wheel axle 26, 28. In this example, the rearmost axle 28 may be a drive axle, while the other one is a lift axle 26. In FIG. 2A the lift axle 26 is in its lowered ride condition. Thus, the tires of wheels 22, 24 of both the lift axle 26 and the drive axle 28 are in contact with the ground, contributing to carrying the load of the vehicle.

In FIG. 2A, an air supply control arrangement 30 is operatively connected to the lift axle 26. The air supply control arrangement 30 comprises a control valve 32. FIG. 2A just shows very schematically the outside of the control valve 32, such as a housing of the control valve 32. The interior of the control valve 32 will be discussed in more detail in connection with other drawing figures. In FIG. 2A, the air supply control arrangement 30 also comprises a lever 34 having a first portion 36 which is connected to the control valve 32 and having a second portion 38 configured to be connected to the lift axle 26. In FIG. 2A, the second portion 38 of the lever 34 is indeed mechanically connected to the lift axle 26 via a lifting mechanism 40 of/for the lift axle 26.

Turning now to FIG. 2B, the lift axle 26 is now show in its lift condition, thus not contributing to supporting the vehicle load. The lift axle 26 may, for instance, be provided in this lift condition, when the vehicle does not carry any considerable weight, whereby ground friction is reduced by lifting the lift axle 26. As will be discussed in more detail below, the second portion 38 of the lever 34 will follow the motion of the lift axle 26 when it is raised from the ride condition to the lift condition, and this affects the state of the control valve 32.

FIG. 2C illustrates a situation in which the lever 34 has become damaged. For instance, it may have been hit by a loose rock or for some other reasons lost its structural integrity so that the lever 34 can no longer translate the motions of the lift axle 26 to the control valve 32.

As can be understood from FIGS. 2A and 2B, in the illustrated example, when the lift axle 26 is raised from its ride condition in FIG. 2A to its lift condition in FIG. 2B, the lever 34 will rotate counter-clockwise relative to the control valve 32. Conversely, when the lift axle 26 is lowered from its lift condition in FIG. 2B to its ride condition in FIG. 2A, the lever 34 will rotate clockwise relative to the control valve 32.

The lift axle 26 may be a manually controlled (driver controlled) lift axle or it may be an automatically controlled (e.g., load based) lift axle.

Different examples of control valves that could be used as the control valve 32 in FIG. 1 will now be discussed in connection with FIGS. 3A-3B and 4A-4C.

Figure 3A:
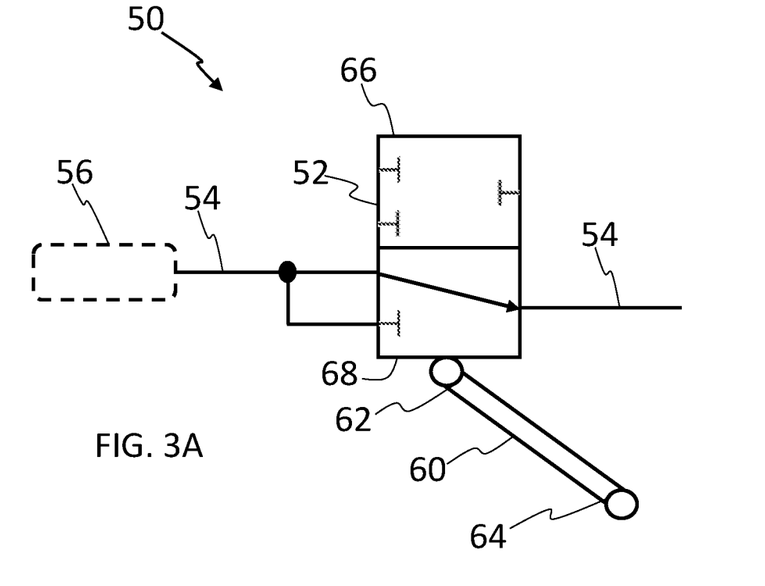
FIGS. 3A-3B schematically illustrates an air supply control arrangement according to one example of this disclosure, wherein a control valve is presented in two different states.
Figure 3B:
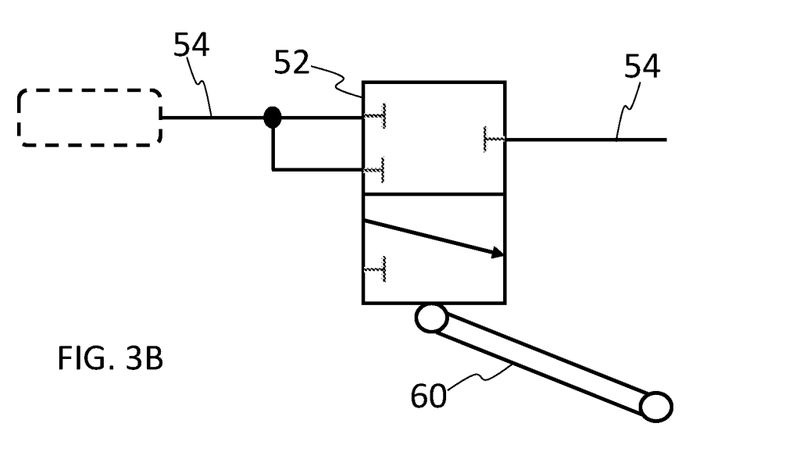

FIGS. 3A-3B schematically illustrates an air supply control arrangement 50 according to one example of this disclosure, wherein a control valve 52 is presented in two different states. FIGS. 3A and 3B may, for instance, illustrate different states which correspond to the states of the control valve 32 for the scenarios illustrated in FIGS. 2A and 2B, respectively.

Starting with FIG. 3A, the air supply control arrangement 50 is intended to be used for a heavy-duty vehicle comprising a lift axle, which lift axle comprises a brake chamber (lift axle and brake chamber not illustrated in FIG. 3A). The air supply control arrangement 50 comprises said control valve 52 configured to be arranged in an air supply passage 54 that enables pressurized air to be supplied from a pressurized air source 56 to a brake chamber of a lift axle of a heavy-duty vehicle. In FIG. 3A the pressurized air source 56 is illustrated in the form of a tank containing pressurized air. The tank may, for instance, become pressurized by means of a compressor. The general inventive concept is, however, not limited to using the air supply control arrangement 50 in connection with a specific type of pressurized air source 56. Indeed, in at least some examples, the pressurized air source 56 is not part of the actual air supply control arrangement 50 (as indicated by the dashed lines), but merely forms part of the environment in which the air supply control arrangement 50 is to be installed and operated. In other examples, it may however be conceivable to include a pressurized air source 56 as part of the air supply control arrangement 50. The air supply control arrangement 50 also comprises a lever 60. The lever 60 has a first portion 62 which is connected to the control valve 52 and a second portion 64 configured to be connected to the lift axle.

As can be seen in FIGS. 3A and 3B, the control valve 52 is open in FIG. 3A allowing pressurized air to pass through the control valve 52 along the air supply passage 54, and the control valve 52 is closed in FIG. 3B, preventing pressurized air to pass through the control valve 52 along the air supply passage 54. The closed state in FIG. 3B represents an example of a closed first state of the control valve 52, which has been discussed elsewhere in this disclosure. The open state in FIG. 3A represents an open second state of the control valve 52, which has also been discussed elsewhere in this disclosure.

In its operational state of the air supply control arrangement 50, when the second portion of the lever 64 has been connected to a lift axle of a heavy-duty vehicle, the functioning may be as follows. When the lift axle is raised from its ride condition to its lift condition (for example a change from the ride condition in FIG. 2A to the lift condition in FIG. 2B), the lever moves 60 the control valve 52 from the open second state (FIG. 3A) to the closed first state (FIG. 3B). When the lift axle is lowered from its lift condition to its ride condition, the lever 60 moves the control valve 52 from the closed first state (FIG. 3B) to the open second state (FIG. 3A).

With reference to FIG. 3A, the control valve 52 may have an upper end 66 and a lower end 68, wherein the control valve 52 may be configured to be mounted to the heavy-duty vehicle so that the upper end 66 is located above the lower end 68. Thus, the lower end 68 will be closer to the ground, and the upper end 66 will be further away from the ground. In this disclosure, a direction extending from the lower end 68 to the upper end 66 may be defined as an upwards direction. The lever 60 is configured to push the control valve 52 upwards when the lift axle is lowered from its lift condition to its ride condition. Thus, when the lift axle is lowered from its lift condition to its ride condition, the lever 60 will move with the lift axle from the state in FIG. 3B, pushing the control valve 52 upwards, so that the control valve 52 arrives at the state illustrated in FIG. 3A. It should be noticed that when referring to pushing the control valve 52 upwards, not all parts of the control valve 52 need to move upwardly. For instance, the control valve 52 may have a housing within which the relevant functional parts that control the flow of pressurized air are moved, while the outer housing remains stationary.

From the above it may be understood that the switching between the first and second state of the control valve 52 may be mechanically actuated by the lever 60.

From the above it may also be understood that, in at least some examples, a rotating movement of the lever 60 (following the movement of the lift axle), may be translated into a linear movement of the control valve 52. For instance, in the example of FIGS. 3A-3B, a rotating movement of the lever 60 is translated into the a linear upwards or downwards movement of the control valve 52, depending on if the lift axle is being lowered or raised.

As can be seen in the schematic illustrations in FIGS. 3A-3B, when the lift axle is in its lift condition the lever 60 may be configured to extend at a first angle from the control valve (FIG. 3B), and when the lift axle is in its ride condition the lever 60 may be configured to extend at a second angle from the control valve (FIG. 3A), the second angle being different compared to the first angle.

In the example of FIGS. 3A-3B, when the lever extends at said first angle its main direction of extension may be closer to the horizontal compared to when it extends at said second angle. Conversely, when the lever extends at said second angle, its main direction of extension may be closer to the vertical compared to when it extends at said first angle.

The example in FIGS. 3A-3B is an example illustrating a basic principle of the general inventive concept. A more advanced example will now be discussed in relation to FIGS. 4A-4C, which also includes a fail-safe mode of operation.

Figure 4A:
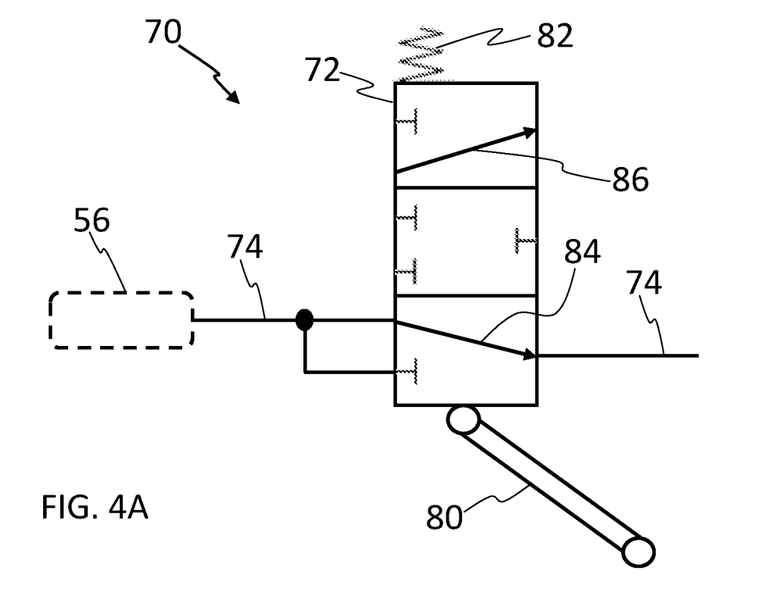
FIGS. 4A-4C schematically illustrates an air supply control arrangement according to one example of this disclosure, wherein a control valve is presented in three different states.
Figure 4B:
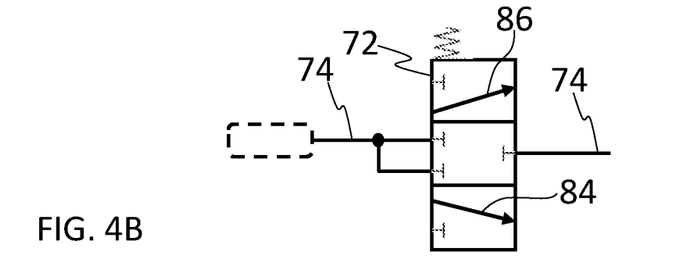
Figure 4C:
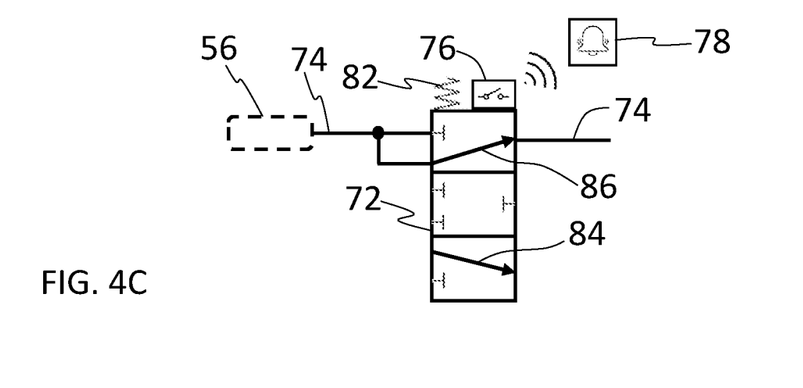

FIGS. 4A-4C schematically illustrates an air supply control arrangement 70 according to one example of this disclosure, wherein a control valve 72 is presented in three different states. Similarly, to the example in FIGS. 3A-3B, the air supply control arrangement 70 of FIGS. 4A-4C comprises the control valve 72 and a lever 80. For simplicity, the lever 80 is only shown in FIG. 4A, and is not shown in the smaller illustrations in FIGS. 4B and 4C.

In addition to the features of the example in FIGS. 3A-3B, the air supply control arrangement 70 in the example in FIGS. 4A-4C further comprises a spring device 82 which is configured to provide a spring force on the control valve 72. The lever 80 is configured to provide a counter-force against the spring force when holding the control valve 72 in either one of the closed first state (FIG. 4B) and/or the open second state (FIG. 4A).

FIG. 4C illustrates the control valve 72 being in an open fail-safe third state. When the lever 80 is broken or damaged (e.g., the scenario with the broken lever 34 schematically illustrated in FIG. 2C) such that the lever 80 fails to provide the counter-force required to hold the control valve 72 in the first or second state, then the spring device 82 causes the control valve 72 to move to the open fail-safe third state in which pressurized air is allowed to pass through the control valve 72 along the air supply passage 74. Hereby, providing a braking action for the lift axle is enabled irrespective of if the lift axle is in its lift condition or its ride condition, thus not jeopardizing the braking function when the lift axle is in its ride condition.

As further indicated schematically in FIG. 4C, the control valve 72 may comprise an integrated switch 76. When the control valve 72 reaches the open fail-safe third state the switch 76 gets closed, thereby triggering an alert 78 to the driver. Such an alert 78 may, for instance, include an alert signal sent via wireless or wire-bound communication.

With particular reference to FIGS. 4A and 4C, the control valve 72 may comprise two channels 84, 86. When the control valve 72 is in the open second state (FIG. 4A), one channel 84 connects the pressurized air source 56 located upstream of the control valve 72 with a downstream portion of the air supply passage 74. When the control valve 72 is in the open fail-safe third state (FIG. 4C), another channel 86 connects the pressurized air source 56 with said downstream portion of the air supply passage 74. In the closed first state (FIG. 4B), neither one of the channels 84, 86 enables fluid communication through the control valve 72.

As should be understood from FIGS. 4A-4C, in at least some examples, the control valve 72 may be configured to be movable to three vertically different positions, a highest position, an intermediate position and a lowest position. In the highest position (FIG. 4A), the control valve 72 is in the open second state. In the intermediate position (FIG. 4B) the control valve 72 is in the closed first state. In the lowest position (FIG. 4C), the control valve 72 is in the open fail-safe third state.

Figure 5:
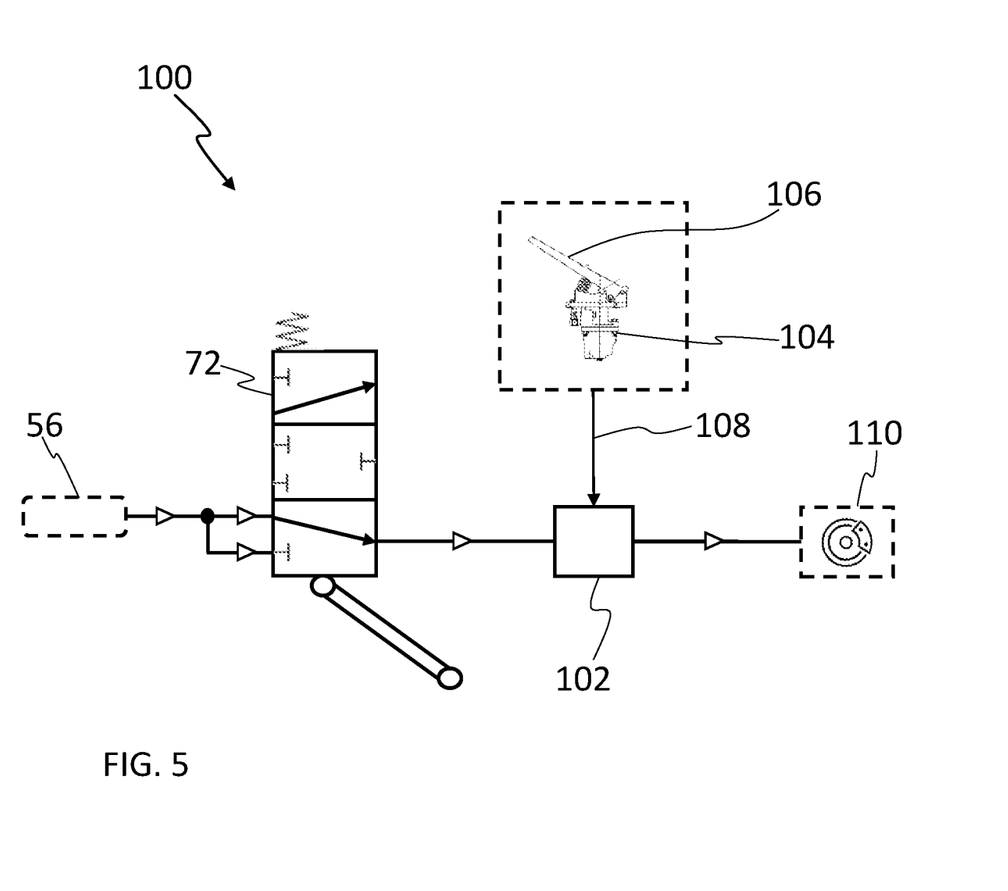
FIG. 5 schematically illustrates an air supply control arrangement according to one example of this disclosure and its relation to certain brake components.

FIG. 5 schematically illustrates an air supply control arrangement 100 according to one example of this disclosure and its relation to certain brake components. As illustrated in FIG. 5, the air supply control arrangement 100 may comprise the control valve 72 exemplified in FIGS. 4A-4C. However, in other examples, another control valve may be used instead, such as the one exemplified in FIGS. 3A-3B.

In addition to the previously discussed component parts, the air supply control arrangement 100 in FIG. 5 further comprises an electronically controlled brake valve device 102. The electronically controlled brake valve device 102 may be controlled by a foot brake modulator 104 which translates the movements of a foot brake pedal 106 into a brake request 108. Thus, when the electronically controlled brake valve device 102 receives the brake request 108 (e.g., in the form of an electric brake signal), the electronically controlled brake valve device 102 is opened. When the electronically controlled brake valve device 102 is opened it allows pressurized air received in the electronically controlled brake valve device 102 to be passed to a brake chamber 110 of the lift axle. When the electronically controlled brake valve device 102 is closed, pressurized air received in the electronically controlled brake valve device 102 is prevented from being passed to the brake chamber 110. The degree of the opening and/or the duration of the opening of the electronically controlled brake valve device 102 is controlled by the brake request 108 from the foot brake modulator 104.

As can be seen in FIG. 5, the control valve 72 is arranged upstream of the electronically controlled brake valve device 102 and downstream of the pressurized air source 56. When the control valve 72 is in the illustrated open second state (or in the open fail-safe third state) and the electronically controlled brake valve device 102 receives a brake request 108, the pressurized air is allowed to be passed to the brake chamber 110, all the way from the pressurized air source 56. However, when the control valve 72 is in the closed first state (i.e., lift axle is in lifted condition and lever is functioning normally), then the control valve 72 blocks pressurized air from reaching the electronically controlled brake valve device 102. In this latter case, there will be no pressurized air supplied from the pressurized air source 56 to the brake chamber 110 even if the electronically controlled brake valve device 102 receives a brake request 1008 from the foot brake modulator 104.

As has been explained herein, the present disclosure also relates to a vehicle which comprises an air supply control arrangement, e.g., an air supply control arrangement 50, 70, 100 according to any one of the examples in FIGS. 3A-3B, 4A-4C and 5. Such a vehicle, may for example be a vehicle like the one in FIG. 1, or it may be another vehicle. As should be understood from the above discussions, and for instance with reference to FIG. 1, the control valve 32 may suitably be mounted to a body part, such as a chassis 20 of the vehicle. Furthermore, in such a vehicle, the second portion 38 of the lever 34 may be connected (directly or indirectly) to the lift axle 26 of the vehicle so as to follow the movements of the lift axle 26. The first portion 36 of the lever 34 may be connected to a bottom portion of the control valve 32 (e.g., at a lower end 68 as illustrated in FIG. 3A). When the lift axle 26 is lowered from its lift condition to its ride condition, the first portion 36 of the lever 34 may push the bottom portion of the control valve 32 upwards.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. An air supply control arrangement for a heavy-duty vehicle comprising a lift axle which comprises a brake chamber, the air supply control arrangement comprising:
    a control valve configured to be arranged in an air supply passage that enables pressurized air to be supplied from a pressurized air source to a brake chamber of a lift axle of a heavy-duty vehicle, wherein the control valve has a closed first state in which pressurized air along the air supply passage is blocked by the control valve, and an open second state in which pressurized air is allowed to pass through the control valve along the air supply passage, and
        wherein the air supply control arrangement further comprises a lever having a first portion which is connected to the control valve and having a second portion configured to be connected to the lift axle so that when the lift axle is raised from its ride condition to its lift condition the lever moves the control valve from the open second state to the closed first state, and when the lift axle is lowered from its lift condition to its ride condition the lever moves the control valve from the closed first state to the open second state.

2. The air supply control arrangement of claim 1, wherein the control valve has an upper end and a lower end, wherein the control valve is configured to be mounted to the heavy-duty vehicle so that the upper end is located above the lower end, wherein a direction extending from the lower end to the upper end is defined as an upwards direction, wherein the lever is configured to push the control valve upwards when the lift axle is lowered from its lift condition to its ride condition.

3. The air supply control arrangement of claim 1, wherein when the lift axle is in its lift condition the lever is configured to extend at a first angle from the control valve, and when the lift axle is in its ride condition the lever is configured to extend at a second angle from the control valve, the second angle being different compared to the first angle.

4. The air supply control arrangement of claim 3, wherein when the lever extends at said first angle its main direction of extension is closer to the horizontal compared to when it extends at said second angle, and when the lever extends at said second angle its main direction of extension is closer to the vertical compared to when it extends at said first angle.

5. The air supply control arrangement of claim 1, further comprising a spring device providing a spring force on the control valve, wherein the lever is configured to provide a counter-force against the spring force when holding the control valve in either one of the closed first state and/or the open second state.

6. The air supply control arrangement of claim 5, wherein the control valve has an open fail-safe third state, wherein when the lever is broken or damaged such that the lever fails to provide the counter-force required to hold the control valve in the first or second state, then the spring device causes the control valve to move to the open fail-safe third state in which pressurized air is allowed to pass through the control valve along the air supply passage.

7. The air supply control arrangement of claim 6, wherein the control valve comprises an integrated switch, wherein when the control valve reaches the open fail-safe third state the switch gets closed, thereby triggering an alert to the driver.

8. The air supply control arrangement of claim 6, wherein the control valve comprises two channels:
    one channel which, when the control valve is in the open second state, connects the pressurized air source located upstream of the control valve with a downstream portion of the air supply passage, and
    another channel which, when the control valve is in the open fail-safe third state, connects the pressurized air source with said downstream portion of the air supply passage.

9. The air supply control arrangement of any claim 6, wherein the control valve is configured to be movable to three vertically different positions, a highest position, an intermediate position and a lowest position, wherein
    when in the highest position, the control valve is in the open second state,
    when in the intermediate position, the control valve is in the closed first state, and
    when in the lowest position, the control valve is in the open fail-safe third state.

10. The air supply control arrangement of claim 1, further comprising:
    an electronically controlled brake valve device, which when opened allows pressurized air received in the brake valve device to be passed to the brake chamber, and when closed prevents pressurized air received in the brake valve device from being passed to the brake chamber, wherein the degree of the opening and/or the duration of the opening of the brake valve device is controlled by an electronic brake request received by the brake valve device,
    wherein the control valve is arranged upstream of the brake valve device and downstream of the pressurized air source, and
    wherein when the control valve is in the open second state and the brake valve device receives an electronic brake request, then pressurized air is allowed to be passed to the brake chamber, whereas when the control valve is in the closed first state and the brake valve device receives an electronic brake request, the control valve blocks pressurized air from the pressurized air source from reaching the brake valve device.

11. The air supply control arrangement of claim 1, wherein the switching between the first and the second state of the control valve is mechanically actuated by the lever.

12. A vehicle comprising the air supply control arrangement of claim 1, the vehicle further comprising a lift axle and a body part, wherein the control valve is mounted to said body part and wherein the second portion of the lever is connected to the lift axle so as to follow movements of the lift axle.

13. The vehicle of claim 12, wherein the first portion of the lever is connected to a bottom portion of the control valve.

14. The vehicle of claim 13, wherein when the lever is lowered from its lift condition to its ride condition, the first portion of the lever pushes the bottom portion of the control valve upwards.

15. The vehicle of claim 12, wherein the lift axle is a manually controlled lift axle or an automatically controlled lift axle.

* * * * *